Figure 1:
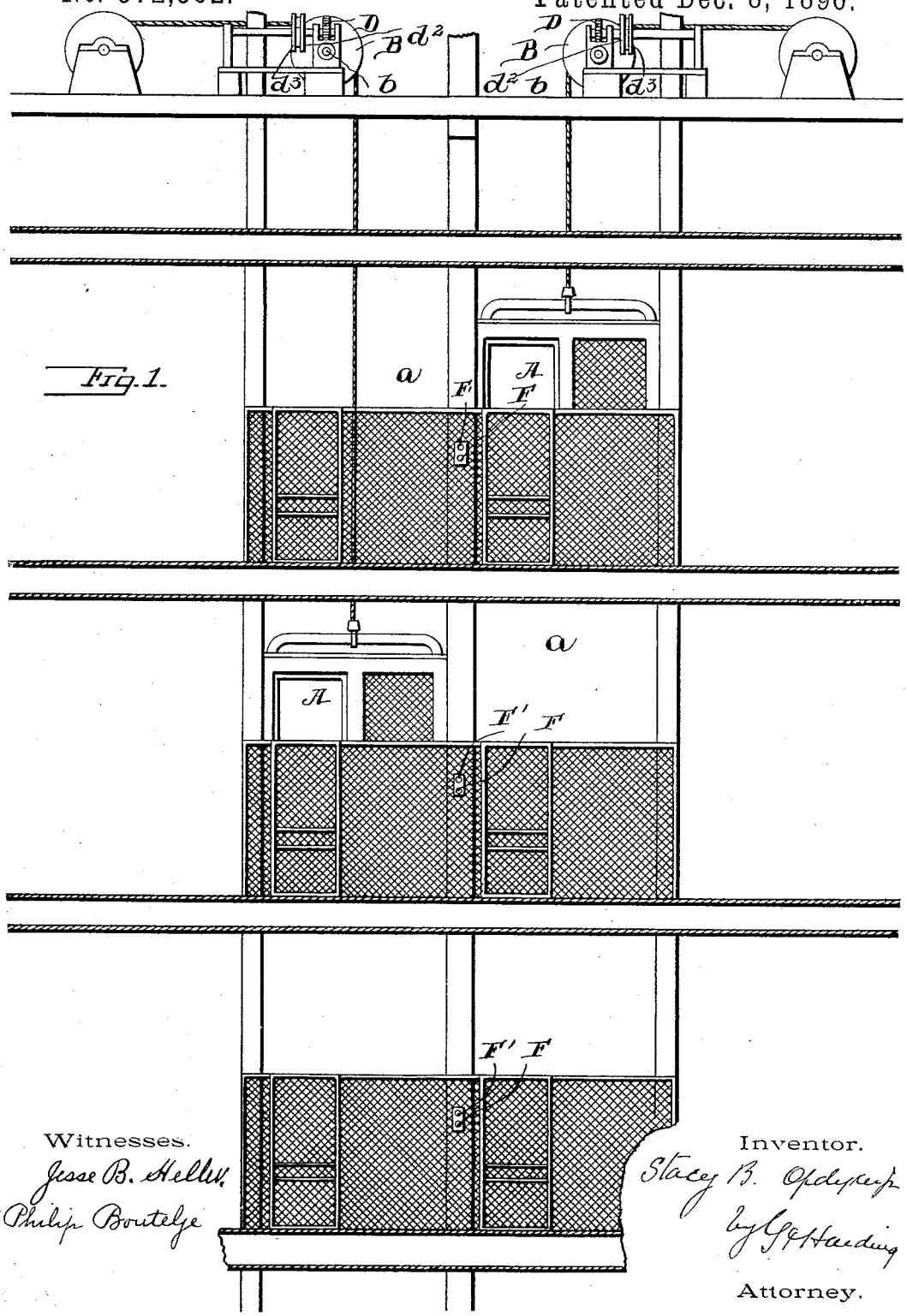

(No Model.) 4 Sheets—Sheet 1.

S. B. OPDYKE, Jr.
ELEVATOR SIGNAL MECHANISM.

No. 572,562. Patented Dec. 8, 1896.

Witnesses.
Jesse B. Hellett
Philip Boutelje

Inventor.
Stacy B. Opdyke Jr.
by G. H. Harding
Attorney.

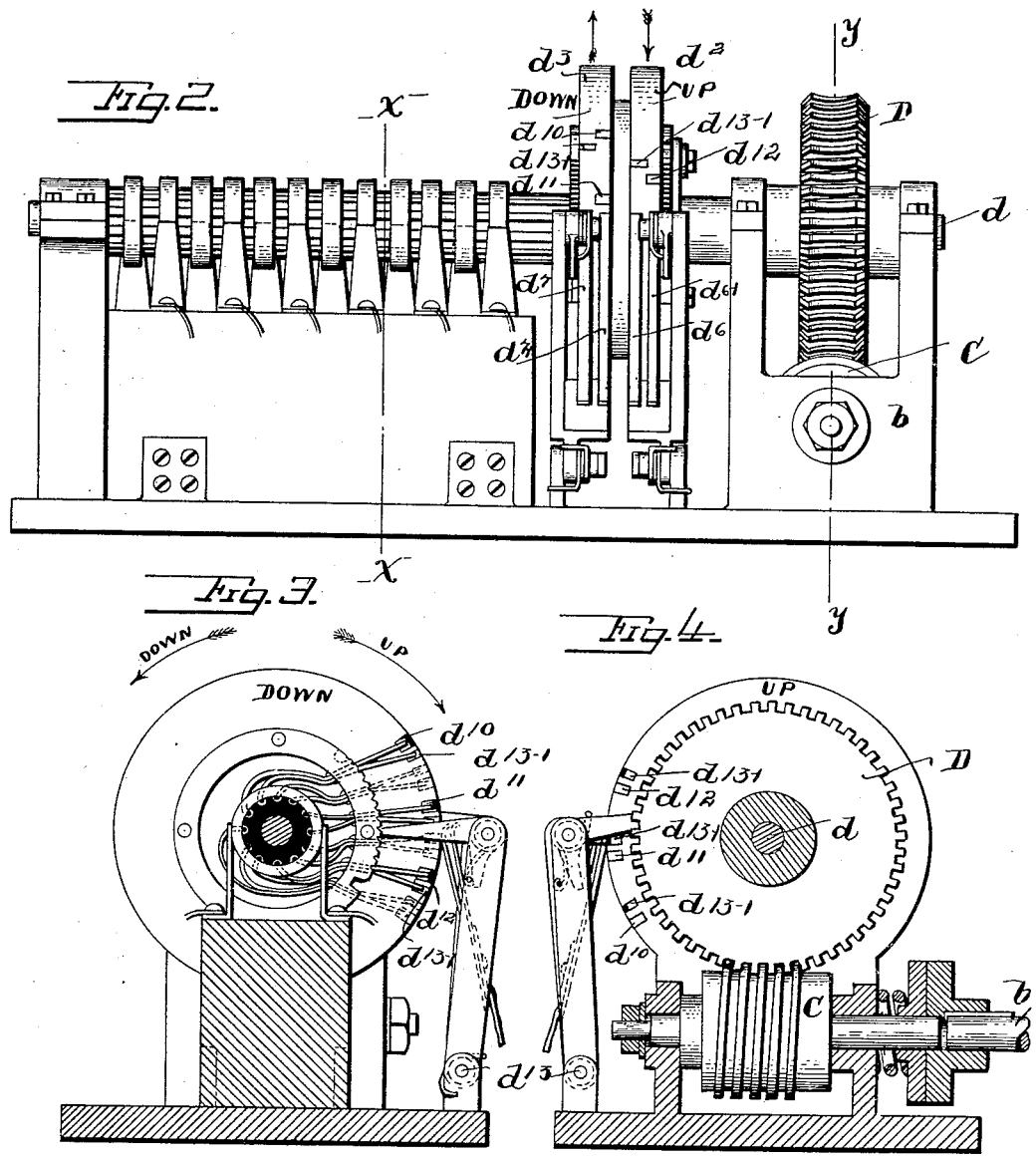

(No Model.) 4 Sheets—Sheet 3.
S. B. OPDYKE, Jr.
ELEVATOR SIGNAL MECHANISM.

No. 572,562. Patented Dec. 8, 1896.

Witnesses.
Jesse B. Heller
Philip Bouteje

Inventor.
Stacy B. Opdyke Jr.
Attorney.

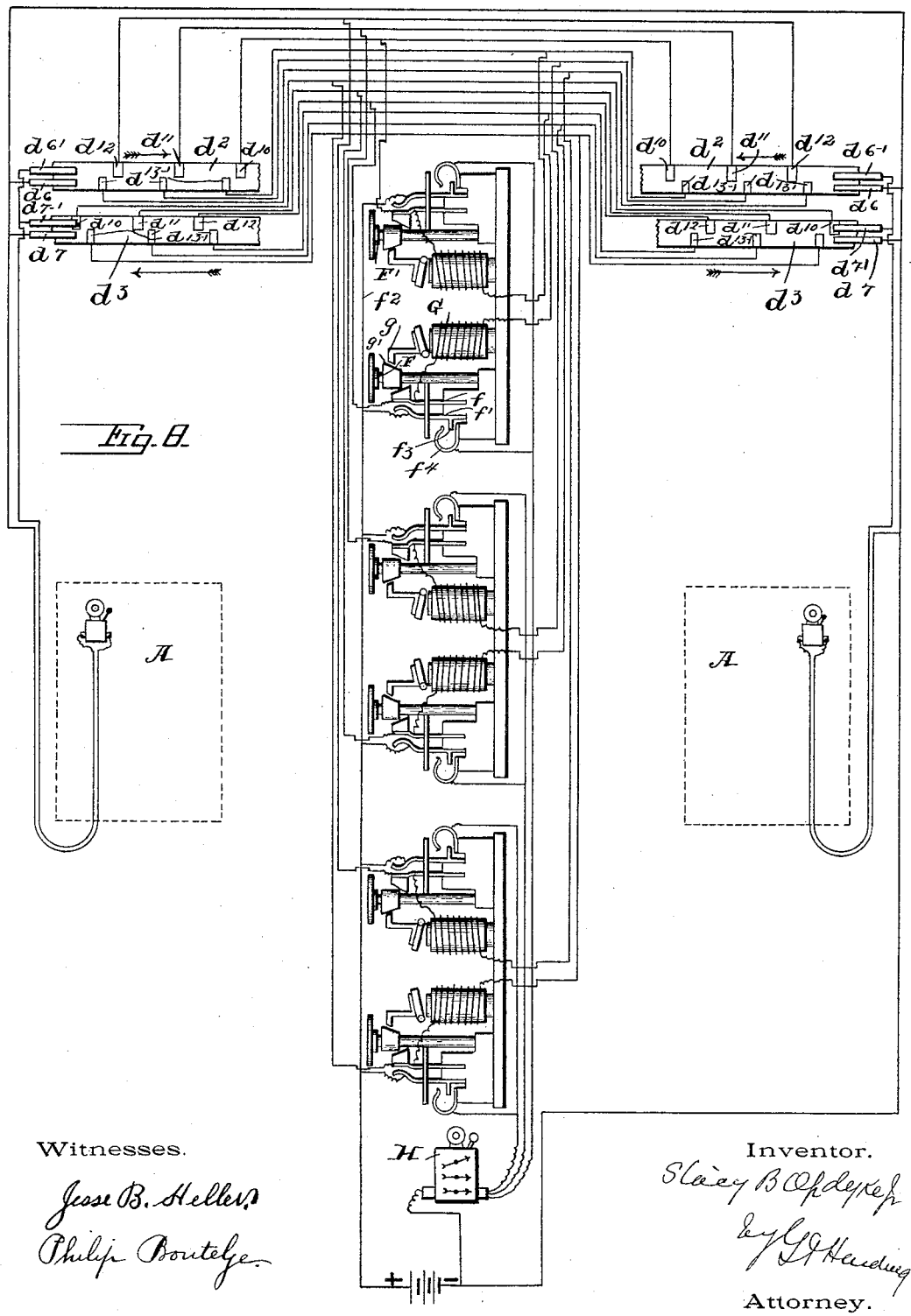

UNITED STATES PATENT OFFICE.

STACY B. OPDYKE, JR., OF PHILADELPHIA, PENNSYLVANIA.

ELEVATOR SIGNAL MECHANISM.

SPECIFICATION forming part of Letters Patent No. 572,562, dated December 8, 1896.

Application filed October 8, 1894. Serial No. 525,195. (No model.)

*To all whom it may concern:*

Be it known that I, STACY B. OPDYKE, Jr., a citizen of the United States, residing at Philadelphia, county of Philadelphia, and State of Pennsylvania, have invented a new and useful Improvement in Elevator Signal Mechanism, of which the following is a full, clear, and exact description, reference being had to the accompanying drawings, which form a part of this specification.

My invention has for its object to provide means for use in a building where two or more elevators are used to enable a passenger at any floor to arrange a signal, either for ascending or descending, which will indicate to the first car approaching in the direction the passenger desires to proceed shortly before reaching said floor.

I will first describe the mechanism as illustrated in the drawings and then particularly point out the invention in the claims.

I have illustrated in the drawings a building equipped with two elevators, although my invention can be used with any number of elevators and any number of floors.

Figure 5:
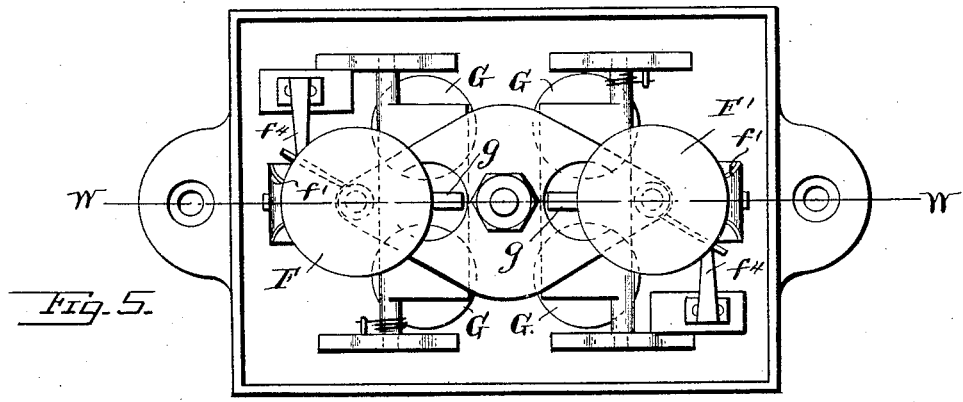
Figure 6:
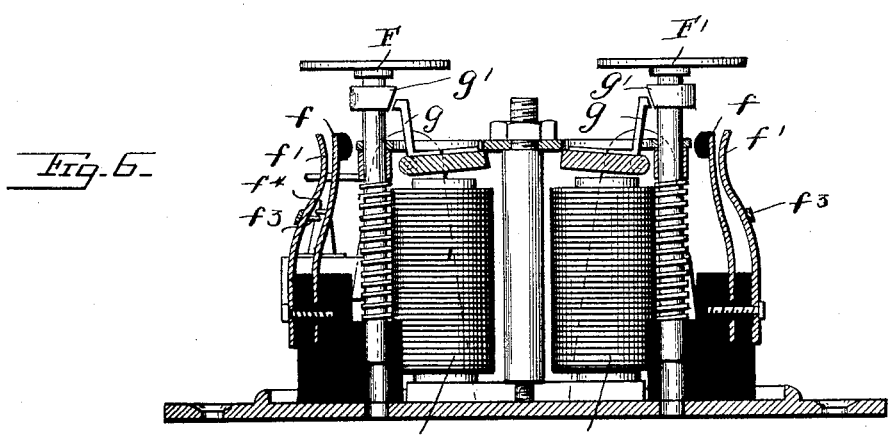
Figure 7:
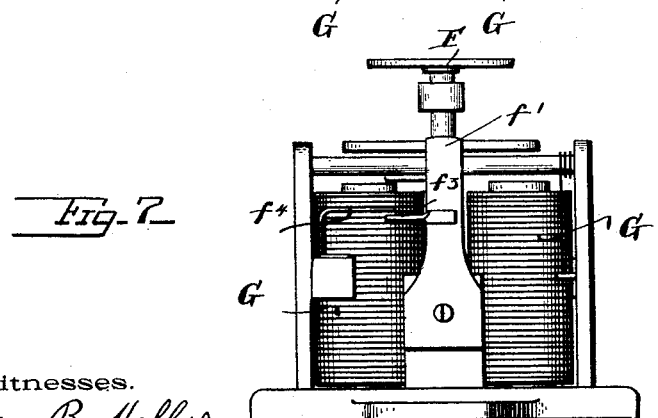

In the drawings, Figure 1 is a side elevation of elevators; Fig. 2, side elevation of commutator; Fig. 3, section on line $x\,x$, Fig. 2; Fig. 4, section on line $y\,y$, Fig. 2; Fig. 5, plan view of signaling device; Fig. 6, section on line $w\,w$, Fig. 5; Fig. 7, end view of same; Fig. 8, diagram of wiring.

A are the elevator-cars, running in the shafts $a$.

B are the lifting-cable pulleys for the lifting-cables of the elevators A, and connected to the shafts $b$ of the pulleys B are the worms C, the worms C gearing into worm-wheels D. Upon each of the shafts $d$ of the worm-wheels D are two commutator-disks $d^2\,d^3$. The connection between the pulleys B and their corresponding worm-wheels D is such that the worm-wheels D and their corresponding commutator-disks move correspondingly to the corresponding elevator from its lowest to its highest point, or vice versa. Upon each commutator-disk are two brushes $d^6\,d^{6'}$ upon disk $d^2$, and $d^7\,d^{7'}$ upon disk $d^3$. These brushes are supported so as to rest against the surface of the corresponding commutators. Upon the commutators, and at positions corresponding to the position of the commutators under the brushes when the corresponding elevator is in the position slightly before reaching a floor, I place the contacts $d^{10}\,d^{11}\,d^{12}$ in line with brushes $d^{7'}\,d^{6'}$, and contacts $d^{13'}\,d^{13'}\,d^{13'}$ in alinement with brushes $d^6\,d^7$, one for each floor, (three floors being shown.) Each brush is secured spring-pivotally upon a shaft $d^{13}$, and the disks each have a circular rack. The brushes corresponding to a pair of commutator-disks are independent of each other, and each has an independent pawl adapted to rest upon the rack of the commutator-disk corresponding to its brush. These pawls are spring-pivotally connected to a frame to which its corresponding brush is connected, but from which said brush is insulated, and this frame is spring-pivotally connected with the shaft $d^{13}$. The pawls are oppositely set, so that in one direction of movement of commutator-disks $d^2\,d^3$ one pawl rides over the teeth and the brush rests against the commutator. While in that direction the teeth of the other ratchet turn its pawl, forcing the brush to which it corresponds off of the commutator-disk, so that one of the pair of disks for each elevator is an indicator in one direction of movement of the car and the other in the other direction, so that one is for the ascent and the other for the descent of its corresponding elevator, and the contacts upon this ascending commutator are at points so as to strike the corresponding brush $d^{6'}$ when the corresponding car is slightly below the different floors, and in the descending elevator the contacts are placed so that they strike the brush $d^{7'}$ when the car is slightly above the different floors.

The contacts $d^{13'}$ are placed in the disk just beyond the contacts $d^{10}\,d^{11}\,d^{12}$, the purpose of which will hereinafter be fully pointed out. Upon the racks, at the end of their desired travel, at one end in one rack and on the other end in the other, is placed a deep tooth, into which the pawl of the inactive brush drops, preventing further movement in that direction of the commutator-disks. Any further movement of the lifting-pulley would merely sever the friction connection of its shaft with the shaft of the worm.

At each floor is placed the device which is shown in Figs. 5, 6, and 7, which consists of the two independent spring-plungers F F'.

One of these, F, is for the down indication, and the other, F', for the up indication. I will describe one, to wit, the down-indication plunger device F, as the other one is merely a duplication, with the exception of the electrical connections. This plunger F in its downward movement strikes a projection on the leaf-spring $f$, which forces it into contact with another leaf-spring, $f'$, which is in electrical connection with one pole of the source of current supply by means of connection with a line-wire $f^2$ from one pole of the source of current supply. From the leaf-spring $f$, which is struck by the plunger in its downward movement, runs a wire which passes upward, branching to the contact of the contacts of all the descending commutator-disks corresponding to that floor. If this method is carried out throughout the various floors, there may be made electrical connection with each plunger F, that is, each floor and the contact on the commutator-disk corresponding to that floor. The circuit is completed by an electric connection between the brushes corresponding to the descending commutator-disks and the other pole of the current supply through the signal in the car corresponding to said brush, so that, say, in any floor the down plunger is forced downward, making electrical connection between the two leaf-springs and all the commutator-contacts corresponding to that floor, and when the contact on the commutator-disk reaches its corresponding brush, which will be when the first elevator descending is slightly above the floor for which the signal was given, then the circuit will be completed and the signal given to that car, no other car receiving any signal. The up-signal plunger for each floor is connected in the same manner, one leaf-spring, $f'$, being in direct electrical connection from one pole of the source of current supply, and the other leaf-spring, which is acted upon by the spring-plunger, being in electrical connection with the corresponding contact upon the ascending commutator-disks corresponding to that floor, so that when said signal is set the commutator-disk of the first elevator ascending will have the contact so connected that when it strikes the brush which is in electrical connection with the other pole of the battery it will give signal to the operator just before he reaches that floor.

In order to hold the plunger down and thus retain the circuit ready to be closed by the passage of the commutator-disk contact in contact with its brush, each plunger has an independent but corresponding electromagnet G, the armature of which is pivoted and carries a catch $g$, which is adapted to pass over a projection $g'$ upon the plunger F or F' when it is forced down and retain it in its downward position. This electromagnet is in electrical connection with a wire from one pole of the source of current supply when the plunger is forced downward by means to a wire connecting said magnet and the leaf-spring $f'$, acted on by the plunger. It is also in electrical connection with the contacts $d^{13'}$. If it be the down magnet, it is connected with the contacts $d^{13'}$ on the down commutator-disk. If it be the up magnet, it is connected with the contacts $d^{13'}$ on the ascending commutator-disk, and the brushes $d^6$ and $d^7$, corresponding to these contacts, are in electrical connection with the other pole of current supply, so that when these brushes come in contact with the contacts $d^{13'}$ the circuit is closed to the magnet and draws its armature down, releasing the spring-plunger, and the spring returns it up again, breaking the circuit. Of course this cannot occur unless previously the plunger has been forced downward, so as to make an electrical connection to the commutator-contact corresponding to the floor, and it must occur after the brush has first acted to complete the circuit to the signal in the car, and then passes on off of that contact, and the brush $d^6$ or $d^7$ reaches the contact $d^{13'}$, when it releases the plunger. In Fig. 8 is shown three sets of signal apparatus, corresponding to three floors, with their connections to two elevators, and two sets of commutator-disks. As may be seen, in this apparatus the circuit in which is the signal is always open except at the time of use. The signal apparatus, after having been set and received, is automatically returned to its initial position. The passenger at any floor can by either pushing the up or down plunger in, depending upon the direction he desires to go, signal the first elevator going in the direction he desires just before it reaches his floor.

In case that all of the elevators should be down and not in motion, which might be the case, for instance, at night or early in the morning, I provide the following means for signaling:

H is an indicator at the basement or lower floor of the building, or, in fact, it might be placed in each car. All the points in this indicator are connected directly with one pole of the source of current supply, the pole opposite to that to which the leaf-spring $f$ is connected. Projecting from the leaf-spring $f$ is a flexible or yielding contact $f^3$, and projecting from the plunger is a pin which strikes a second yielding contact $f^4$ and forces it in contact with the contact $f^3$, projecting from the leaf-spring. This contact $f^4$ is in electrical connection with an indicator needle or drop in the indicator H, corresponding to the floor of the signal apparatus.

In order to press the spring-contact $f^4$ against the contact projecting from the spring-arm $f^3$, it is necessary to force the plunger down slightly below the point where it is held by the catch connected to the armature of the magnet, so as to prevent the indicator from ringing continuously. It is placed so slightly below that the normal pressure in forcing the plunger down will make the contact, but when the finger is released the spring of the plunger will return it up a distance sufficient to break the contact. This last-mentioned device should be connected with both of the plungers, the down and up.

Having now fully described my invention, what I claim, and desire to protect by Letters Patent, is—

1. In combination with an elevator-car provided with a signal and mechanism for operating the car, of a series of contacts corresponding to but not located at the floors, a brush common to all the contacts, said brush being located outside and detached from the car, and means to give a relative movement between the contacts and brush corresponding to the movement of the elevator-car relative to the floors, normally open circuits including the brush, the signal and each of the contacts, and a circuit-closing device at each floor whereby when the circuit is connected at any floor and the brush makes connection with the corresponding contact the circuit is completed to the signal.

2. In combination with an elevator-car provided with a signal and mechanism for operating the car, of a series of contacts corresponding to but not located at the floors, a brush common to all the contacts, said brush being located outside and detached from the car, and means to give a relative movement between the contacts and brush corresponding to the movement of the elevator-car relative to the floors, normally open circuits each including the signal, the brush, and one of the contacts, a switch at each floor in the circuit to its corresponding contact, whereby upon the closing of the switch at any floor the circuit is connected to its corresponding contact and is completed to the signal when the brush makes contact with the contact corresponding to said switch.

3. In combination with an elevator-car provided with a signal and mechanism for operating the car, of a series of contacts corresponding to the floors, a brush common to all the contacts, and means to give a relative movement between the contacts and brush corresponding to the movement of the elevator-car relative to the floors, normally open circuits each including the brush, signal and one of the contacts, a switch at each floor in the circuit to its corresponding contact provided with a spring or equivalent device adapted to hold said switch open, an electromagnet adjacent to said switch, the armature of which is provided with a locking device adapted to hold said switch closed when the magnet is inactive, and release said switch when energized, a circuit including said switch and electromagnet and its corresponding contact, a second series of contacts corresponding to the floors, and a brush, the brush and contacts being given a relative movement corresponding to the movement of the car, said last-mentioned contacts being arranged so that the brush makes contact with the corresponding magnet-contact after the brush of the first-mentioned contacts has made contact with the corresponding contact.

4. In combination with an elevator-car provided with a signal and mechanism for operating the car, of two series of contacts, the contacts of each series corresponding to but not located at the floors, a brush for each series of contacts, said brush being located outside and detached from the car, and means to give a relative movement between the contacts and their corresponding brushes corresponding to the movement of the car, the brush of one series being adapted to make contact with its series of contacts in the movement of the car in one direction, and the other brush with its contacts in the movement of the car in the other direction, normally open circuits each including the signal in the car, and one of the contacts and said brush, two switches at each floor, one switch in the circuit to its corresponding contacts in one series of contacts, the other in the circuit to its corresponding contact of the other series of contacts, whereby, dependent upon which switch is closed, the circuit to the signal in the car is closed when the brush is in contact with the contact corresponding to that of the switch.

5. In combination with a series of elevator-cars, each provided with a signal and mechanism for operating the car, of a series of contacts corresponding to, but not located at, the floors for each elevator, a brush for each series of contacts, said brush being located outside and detached from the car, and means to give a relative movement between the contacts and brush of each elevator corresponding to the movement of said elevator relative to the floors, normally open circuits, each including a signal and the corresponding contact of the series of contacts corresponding to said signal and its corresponding brush, a switch at each floor in the circuit to the corresponding contacts of all the series of contacts, whereby when the switch is closed the first brush of the series which makes contact with the contact corresponding to the switch will close the circuit to the signal.

6. In combination with a series of elevator-cars, each provided with a signal and mechanism for operating the car, of two series of contacts for each elevator, the contacts of each series corresponding to but not located at the floors, a brush for each series of contacts, said brush being located outside and detached from the car, and means to give a relative movement between the contacts and their corresponding brushes corresponding to the movement of the car relative to the floors, the brush of one series of each pair of series of contacts being adapted to make contact with its series of contacts in the movement of the car in one direction, and the brush of the other series of each pair of series of contacts in the movement of the car in the other direction, normally open circuits, each including the signal in the car and one of the contacts and its brush, two switches at each floor, one in the circuit to the corresponding contacts of all of one of the pairs of series of contacts, the other in the circuit to corresponding contacts of all of the other of the pairs of series of contacts.

7. In combination with an elevator-car provided with a signal and mechanism for operating the car, of a series of contacts corresponding to the floors, a brush common to all the contacts, and means to give a relative movement between the contacts and brush corresponding to the movement of the elevator-car, a source of current supply, a device at each floor consisting of a contact in electrical connection with one pole of the source of current supply, a spring-plunger a contact adapted in the movement of the plunger to be brought in contact with the last-mentioned contact, electrical circuit to the signal through said contact operated by the plunger, the brush and the contact of the series corresponding to said floor.

8. In combination with an elevator-car provided with a signal and mechanism for operating the car, of two series of contacts, the contacts of each series corresponding to the floors, a brush for each series of contacts, and means to give a relative movement between the contacts and their corresponding brushes corresponding to the movement of the car, the brush of one series being adapted to make contact with its series of contacts in the movement of the car in one direction, and the other brush with its contacts in the movement of the car in the other direction, a source of current supply, two devices at each floor, each consisting of a contact in electrical connection with one pole of the source of current supply, a spring-plunger a contact adapted in the movement of the plunger to be brought in contact with the last-mentioned contact, electrical circuit to the signal through the last-mentioned contact operated by the plunger of one of said devices, its corresponding contact of one series of contacts and its corresponding brush, and electrical circuit to the signal through the last-mentioned contact carried by the plunger of the other of said devices its corresponding contact of the other series of contacts, and its corresponding brush.

9. In combination with a series of elevator-cars, each provided with a signal and mechanism for operating the car, of a series of contacts corresponding to the floors for each elevator, a brush for each series of contacts and means to give a relative movement between the contacts and brush of each elevator corresponding to the movement of said elevator, a source of current supply, a device at each floor consisting of a contact in electrical connection with one pole of the source of current supply, a spring-plunger a contact adapted in the movement of the plunger to be brought in contact with the last-mentioned contact, electric circuits through said contact to the signals in the cars through the contact of each of the series corresponding to said floor and its corresponding brush.

10. In combination with a series of elevator-cars, each provided with a signal and mechanism for operating the car, of two series of contacts for each elevator, the contacts of each series corresponding to the floors, a brush for each series of contacts, and means to give a relative movement between the contacts and their corresponding brushes corresponding to the movement of the car, the brush of one series of each pair of series of contacts being adapted to make contact with its series of contacts in the movement of the car in one direction, and the brush of the other series of each pair of series of contacts in the movement of the car in the other direction, two devices at each floor, each consisting of a contact in electrical connection with one pole of the source of current supply, a spring-plunger a contact adapted in the movement of the plunger to be brought in contact with the last-mentioned contact, electric circuit through said last-mentioned contact of one of said devices to the signals in the cars through the corresponding contacts of one set of series of contacts and its brushes, and through said last-mentioned contact of the other of said devices to the signals in the cars through the corresponding contacts of the other set of series of contacts and its brushes.

11. In combination with an elevator-car provided with a signal and mechanism for operating the car, of a series of contacts corresponding to the floors, a brush common to all the contacts, and means to give a relative movement between the contacts and brush corresponding to the movement of the elevator-car, a source of current supply, a device at each floor consisting of a contact in electrical connection with one pole of the source of current supply, a spring-plunger a contact adapted in the movement of the plunger to be brought in contact with the last-mentioned contact, electrical connection to the signal through said contacts operated by the plunger and the contact of the series corresponding to said floor and its brush, an electromagnet adjacent to said plunger, the armature of which is provided with a locking device adapted to engage and hold said plunger when the magnet is inactive and release said plunger when energized, electrical connection between the magnet and one pole when the plunger is down, a second set of contacts corresponding to the floors, and a brush given a relative movement corresponding to the movement of the car, said last-mentioned contacts being arranged so that the brush makes contact with its corresponding magnet-contact after the brush of the first-mentioned contact has made contact with its corresponding contact and electric circuit through said magnet its corresponding contact and its brush.

12. In combination with an elevator-car provided with a signal and mechanism for operating the car, of a series of contacts corresponding to the floors, a brush common to all the contacts, and means to give a relative movement between the contacts and brush corresponding to the movement of the elevator-car, a source of current supply, a device at each floor consisting of a contact in electrical connection with one pole of the source of current supply, a spring-plunger a contact adapted in the movement of the plunger to be brought in contact with the last-mentioned contact, electrical connection to the signal through said contact operated by the plunger, the contact of the series corresponding to said floor and its brush an electromagnet adjacent to said plunger, the armature of which is provided with a locking device adapted to engage and hold said plunger when the magnet is inactive and release said plunger when energized, electrical connection between the magnet and one pole when the plunger is down, a second set of contacts corresponding to the floors and a brush given a relative movement corresponding to the movement of the car, said last-mentioned contacts being arranged so that the brush makes contact with its corresponding magnet-contact after the brush of the first-mentioned contact has made contact with its corresponding contact, and electric connection between said magnet and the other pole of current supply through its corresponding contact and said contact-brush, a second contact operated by the plunger in electrical connection with first-mentioned contact of plunger, a contact in line of movement of said second plunger contact, and a circuit including a signal, the last-mentioned contact and plunger-contact.

13. In combination with an elevator-car provided with a signal and mechanism for operating the car, of a series of contacts corresponding to the floors, a brush common to all the contacts, and means to give a relative movement between the contacts and brush corresponding to the movement of the elevator-car, a source of current supply, a device at each floor consisting of a contact in electrical connection with one pole of the source of current supply, a spring-plunger a contact adapted in the movement of the plunger to be brought in contact with the last-mentioned contact, electrical connection to the signal through said contact operated by the plunger, the contact of the series corresponding to said floor and its brush an electromagnet adjacent to said plunger, the armature of which is provided with a locking device adapted to engage and hold said plunger when the magnet is inactive, and release said plunger when energized, electrical connection between the magnet and one pole when the plunger is down, a second set of contacts corresponding to the floors, and a brush given a relative movement corresponding to the movement of the car, said last-mentioned contacts being arranged so that the brush makes contact with its corresponding magnet-contact after the brush of the first-mentioned contact has made contact with its corresponding contact and electric connection between said magnet and the other pole of current supply through its corresponding contact, and said contact-brush, a second contact carried by the plunger in electrical connection with first-mentioned contact of plunger, a contact in line of movement of said second plunger-contact but in such position that the plunger must be forced below the catch to make connection, and a circuit including a signal, the last-mentioned contact and plunger-contact.

14. In combination with an elevator-car provided with a signal and mechanism for operating the car, of a series of contacts corresponding to the floors, a brush common to all the contacts, and means to give a relative movement between the contacts and brush corresponding to the movement of the elevator-car, a source of current supply, a device at each floor consisting of a contact in electrical connection with one pole of the source of current supply, a spring-plunger, a contact adapted in the movement of the plunger to be brought in contact with the last-mentioned contact, electrical connection to the other pole of current supply from said contact, carried by the plunger and through the signal the contacts of the series corresponding to said floor and the contact-brush, a catch to hold said plunger when closed, a second contact operated by the plunger in electrical connection with first-mentioned contact of plunger, a contact in line of movement of said second plunger-contact, and a circuit including a signal the last-mentioned contact and plunger-contact.

15. In combination with an elevator-car provided with a signal and mechanism for operating the car, of a series of contacts corresponding to the floors, a brush common to all the contacts, and means to give a relative movement between the contacts and brush corresponding to the movement of the elevator-car, a source of current supply, a device at each floor consisting of a contact in electrical connection with one pole of the source of current supply, a spring-plunger a contact adapted in the movement of the plunger to be brought in contact with the last-mentioned contact, electrical connection to the other pole of current supply from said contact operated by the plunger, and through the signal the contacts of the series corresponding to said floor and the contact-brush, a catch to hold said plunger when closed, a second contact operated by the plunger in electrical connection with the first-mentioned contact of plunger, a contact in line of movement of said second plunger-contact but in such position that the plunger must be forced below the catch to make connection, and a circuit including a signal the last-mentioned contact and plunger-contact.

16. In combination with an elevator-car provided with a signal and mechanism for operating the car, of a commutator-disk rotated corresponding with the car, contacts corresponding with the floors, a brush adapted to make connection with the contacts, normally open circuits to the signal through each of the contacts and its brush, a switch at each floor in the circuit to its corresponding contact, whereby upon the closing of the switch at any floor the circuit is connected to its corresponding contact and is completed to the signal when the brush makes contact with the contact corresponding to said switch.

17. In combination with an elevator-car provided with a signal and mechanism for operating the car, of a pair of commutator-disks rotated corresponding with the car, contacts corresponding with the floors upon each disk, a brush for each disk, the brush at one disk being adapted to make connection with its contacts in the rotation of the disks in one direction and the other brush to make connection with the contacts in the movement of its disk in the other direction, normally open circuits including the signal in the car and each of the contacts, two switches at each floor, one switch in the circuit to its corresponding contact in one series of contacts, the other in the circuit to its corresponding contact of the other series of contacts, whereby, dependent upon which switch is closed, the circuit to signal in the car is closed, when the brush is in contact with the contact corresponding to that of the switch.

18. In combination with an elevator-car provided with a signal and mechanism for operating the car, of a pair of commutator-disks, rotated, corresponding with the car, contacts corresponding with the floors upon each disk, a brush for each disk, said brushes being pivotally secured, a pawl attached to each brush working in corresponding racks secured to said disks said pawls being oppositely set so as to hold each brush off of the commutator in one direction of movement but in opposite direction with reference to each other, normally open circuits including the signal in the car and each of the contacts, two switches at each floor, one switch in the circuit to its corresponding contact in one series of contacts, the other in the circuit to its corresponding contact of the other series of contacts whereby dependent upon which switch is closed, the circuit to signal in the car is closed when the brush is in contact with the contact corresponding to that of the switch.

19. In combination with an elevator-car provided with a signal and mechanism for operating the car, of a commutator-disk, rotated, corresponding with the car, contacts corresponding with the floors, a brush adapted to make connection with the contacts, a source of current supply, a device at each floor consisting of a contact in electrical connection with one pole of the source of current supply, a spring-plunger, a contact adapted in the movement of the plunger to be brought in contact with the last-mentioned contact, electrical connection through the signal between said contacts operated by the plunger and the contact of the series corresponding to said floor, and electrical connection between the brush and the other pole of the source of current supply.

20. In combination with an elevator-car provided with a signal and mechanism for operating the car, of a pair of commutator-disks rotated corresponding with the car, contacts corresponding with the floors upon each disk, a brush for each disk, the brush of one disk being adapted to make connection with its contacts in the rotation of the disks in one direction and the other brush to make connection with the contacts in the movement of its disk in the other direction, a source of current supply, two devices at each floor, each consisting of a contact in electrical connection with one pole of the source of current supply, a spring-plunger a contact adapted in the movement of the plunger to be brought in contact with the last-mentioned contact, electrical connection through the signal between the last-mentioned contact operated by the plunger of one of said devices and its corresponding contact of one series of contacts and electrical connection through the signal between the last-mentioned contact operated by the plunger of the other of said devices and its corresponding contact of the other series of contacts and electrical connection between the brushes and the other pole of current supply.

21. In combination with an elevator-car provided with a signal and mechanism for operating the car, of a pair of commutator-disks rotated corresponding with the car, contacts corresponding with the floors upon each disk, a brush for each disk, said brushes being pivotally secured, a pawl attached to each brush working in corresponding racks secured to said disks, said pawls being oppositely set so as to hold each brush off of the commutator in one direction of movement but in opposite directions with reference to each other, a source of current supply, two devices at each floor, each consisting of a contact in electrical connection with one pole of the source of current supply, a spring-plunger a contact adapted in the movement of the plunger to be brought in contact with the last-mentioned contact, electrical connection through the signal between the last-mentioned contact carried by the plunger of one of said devices and its corresponding contact of one series of contacts and electrical connection through the signal between the last-mentioned contact carried by the plunger of the other of said devices and its corresponding contact of the other series of contacts, and electrical connection between the brushes and the other pole of current supply.

22. In combination with an elevator-car provided with a signal and mechanism for operating the car, of a series of contacts corresponding to but not located at the floors, a brush outside the car having a movement corresponding to the movement of the car relative to the floors and common to all the contacts, means to give a relative movement between the contacts and brush, normally open circuits including the contact, the brush and the signal in the car, and a switch device at each floor, the arrangement being such that when the switch is operated and the brush makes contact with contact corresponding to the switch operated, the corresponding car-signal is operated.

In testimony of which invention I have hereunto set my hand.

STACY B. OPDYKE, JR.

Witnesses:
PHILIP BOUTELJE,
FRANCES ELLIS.